(12) United States Patent
Piccioni et al.

(10) Patent No.: US 11,059,165 B2
(45) Date of Patent: Jul. 13, 2021

(54) METHOD AND SYSTEM FOR ASSISTED OBJECT HANDLING IN DANGEROUS ENVIRONMENTS

(71) Applicant: Safe-T-Arm, LLC, Rowlett, TX (US)

(72) Inventors: Robert L. Piccioni, Rowlett, TX (US); Matthew B. Talpis, Austin, TX (US)

(73) Assignee: Safe-T-Arm, LLC, Rowlett, TX (US)

( * ) Notice: Subject to any disclaimer, the term of this patent is extended or adjusted under 35 U.S.C. 154(b) by 0 days.

(21) Appl. No.: 15/727,603

(22) Filed: Oct. 7, 2017

(65) Prior Publication Data

US 2018/0029219 A1  Feb. 1, 2018

Related U.S. Application Data

(63) Continuation-in-part of application No. 11/943,570, filed on Nov. 20, 2007, now Pat. No. 9,815,205.

(60) Provisional application No. 60/952,511, filed on Jul. 27, 2007.

(51) Int. Cl.
| | |
|---|---|
| *B25J 3/04* | (2006.01) |
| *B25J 15/10* | (2006.01) |
| *B25J 11/00* | (2006.01) |
| *B66C 23/44* | (2006.01) |
| *B25J 19/02* | (2006.01) |
| *F41H 9/04* | (2006.01) |

(52) U.S. Cl.
CPC ............. *B25J 3/04* (2013.01); *B25J 11/0025* (2013.01); *B25J 15/10* (2013.01); *B25J 19/023* (2013.01); *B66C 23/44* (2013.01); *F41H 9/04* (2013.01)

(58) Field of Classification Search
CPC . B25J 3/04; B25J 11/0025; B25J 15/10; B25J 19/023; B25J 9/046; B25J 15/08; B25J 15/04; B25J 5/06; B25J 15/0009; B25J 15/0608; B66C 23/44; F41H 9/04
See application file for complete search history.

(56) References Cited

U.S. PATENT DOCUMENTS

| | | | | |
|---|---|---|---|---|
| 2,908,409 | A | * | 10/1959 | Hinders .................... B66C 3/16 414/740 |
| 3,472,401 | A | * | 10/1969 | Scaperotto ............ E02F 3/4135 294/119.1 |
| 3,533,483 | A | * | 10/1970 | Ballinger ................. B25J 5/005 180/9.38 |
| 3,762,586 | A | * | 10/1973 | Updike, Jr. ............... B65F 3/04 414/408 |
| 4,128,182 | A | * | 12/1978 | Pickrell ..................... B65F 3/00 414/406 |
| 4,706,543 | A | * | 11/1987 | Winkler .................. F41A 25/00 89/38 |

(Continued)

*Primary Examiner* — Glenn F Myers
(74) *Attorney, Agent, or Firm* — Wei Wei Jeang; Grable Martin Fulton PLLC

(57) ABSTRACT

A system for remote object handling including a vehicle having a front portion. An articulated arm has a first end and a second end distinct from the first end, the arm being coupled to the front portion at the first end, and has at least one pivot disposed between the first end and the second end. A gripping element is removably coupled to the second end, wherein the gripping element is one of a pincer device, a hand device having at least three fingers or a shovel. A video camera is also coupled to the second end. An arm control is disposed within the vehicle and is operable to control the operation of the arm, the manipulator and the video camera, and a video interface is coupled to the video camera which is operable to display output from the video camera.

28 Claims, 3 Drawing Sheets

(56) References Cited

U.S. PATENT DOCUMENTS

| | | | | |
|---|---|---|---|---|
| 4,718,223 A * | 1/1988 | Suzuki | A01D 46/30 | 56/328.1 |
| 4,869,002 A * | 9/1989 | Glenn | E02F 3/384 | 37/403 |
| 4,932,831 A * | 6/1990 | White | B25J 5/005 | 180/2.1 |
| 5,263,809 A * | 11/1993 | Kent | B25J 5/007 | 172/25 |
| 5,286,160 A * | 2/1994 | Akeel | B05B 13/0292 | 118/326 |
| 5,451,135 A * | 9/1995 | Schempf | B08B 9/0933 | 165/11.2 |
| 5,570,920 A * | 11/1996 | Crisman | B25J 9/104 | 294/111 |
| 5,570,992 A * | 11/1996 | Lemelson | B23Q 11/10 | 414/744.3 |
| 6,507,163 B1 * | 1/2003 | Allen | B25J 9/162 | 14/78 |
| 6,746,063 B1 * | 6/2004 | Sanchez | B21D 43/24 | 271/18.1 |
| 7,540,545 B1 * | 6/2009 | Fetch | B60D 1/00 | 294/106 |
| 7,633,852 B2 * | 12/2009 | Brummette | F42D 5/04 | 370/208 |
| 7,854,108 B2 * | 12/2010 | Koselka | A01D 46/30 | 56/10.2 A |
| 7,860,614 B1 * | 12/2010 | Reger | B25J 9/1671 | 700/264 |
| 7,896,113 B1 * | 3/2011 | Ramirez | B25J 5/005 | 180/9 |
| 2004/0042886 A1 * | 3/2004 | Roberts | B62B 1/002 | 414/607 |
| 2005/0017491 A1 * | 1/2005 | Mein | B60R 11/00 | 280/762 |

* cited by examiner ns, 165 B2

METHOD AND SYSTEM FOR ASSISTED OBJECT HANDLING IN DANGEROUS ENVIRONMENTS

RELATED APPLICATIONS

This application is a Continuation-In-Part application of U.S. Non-Provisional application Ser. No. 11/943,570, which was filed on Nov. 20, 2007, and claims priority to and the benefit of U.S. provisional application 60/952,511 filed Jul. 27, 2007, entitled "Method and System for Assisted Object Handling in Dangerous Environments" which is incorporated herein by reference in full for all purposes.

TECHNICAL FIELD

The invention relates generally to mechanical systems and, more particularly, the invention relates to remote controlled mechanical manipulators.

DESCRIPTION OF THE RELATED ART

As computers have grown increasingly important in today's society, humans have used computers to automate and enhance various activities that have traditionally been performed manually. Roads are increasingly used on a daily basis to move people and goods among various locations. The large number of vehicles on the roads, along with natural events such as wind and rain, has resulted in an increasing amount of debris and objects being found on the roads. Police officers and others responsible for maintaining traffic flow and safety are often responsible for the removal of these objects and debris items to prevent accidents from occurring due to the objects and debris. In many cases the roads are still in use while the debris and objects are being removed and the individuals removing the items are often placed at significant personal risk from being hit by vehicles traveling on the roads. Indeed, each year numerous private individuals, and local, state and federal employees are injured or killed while removing items from roads.

SUMMARY

A system for remote object removal involving a vehicle is presented. An arm is coupled to the vehicle and a manipulator is coupled to the arm. A remote control is disposed within the vehicle and is operable to control the arm and the manipulator.

Further, a system for remote object handling including a public safety vehicle has a front portion. An articulated arm has a first end and a second end distinct from the first end, the arm being coupled to the front portion at the first end, and has at least one pivot disposed between the first end and the second end. A gripping element is removably coupled to the second end, wherein the gripping element is one of a pincer device, a hand device having at least three fingers or a shovel. A video camera is also coupled to the second end and/or elsewhere on the arm. Alternatively or additionally, a video camera is mounted elsewhere on the vehicle. An arm control is disposed within the vehicle and is operable to control the operation of the arm, the manipulator and the video camera. Alternatively or additionally, the arm control can be used to control the operations of the arm remotely from the vehicle. A video interface is coupled to the video camera which is operable to display output from the video camera. Alternatively or additionally, the video display may be incorporated with the remote arm control so that a user can view the operations of the arm and control its operations while being remotely located from the vehicle.

DESCRIPTION

Each year, more and more vehicles make use of roads to move people and goods among various locations. Often, these vehicles will drop objects on the road, such as ladders and furniture, which are improperly secured to the vehicles. Also, dead or injured animals are commonly found on roads. These objects and animals often cause accidents and vehicle damage due to other vehicles attempting to dodge the objects or impacting the objects. For increased safety of drivers, the objects are removed from the road, sometimes by the person that dropped the object, and sometimes by others. Groups that are asked to remove the objects may include police, game wardens or other local, state or federal employees. Private employees may also be required to remove items from a roadway as part of their job or on a contract basis. Such private groups may include wrecker drivers and employees of private road contractor companies or private companies involved in sporting events such as car racing. Unfortunately, these individuals are placed in significant danger from motorists who are using the road while the individuals are removing the objects. Each year, numerous individuals are injured or killed while attempting to remove objects from the road.

Police officers use various tools to perform their duties and increase their safety. For example, police officers use firearms to defend themselves, bullet resistant vests to decrease the chance of injury due to a bullet, and marked vehicles and uniforms to identify themselves as law enforcement officers. One embodiment of the present invention provides police officers and other public safety personnel with another tool to assist them with roadway object removal tasks. More specifically, a remotely controlled arm may be coupled to the front portion of a police car to allow the police officer to remove objects from the road from the increased safety of the police car instead of going out on the road itself. The remote controlled arm may be controlled by a joystick or other device, and a video camera mounted near the front of the arm may provide the officer the ability to see what is in front of the arm. However, non-police personnel in many different areas may also make use of such a remote controlled arm.

Figure 1:
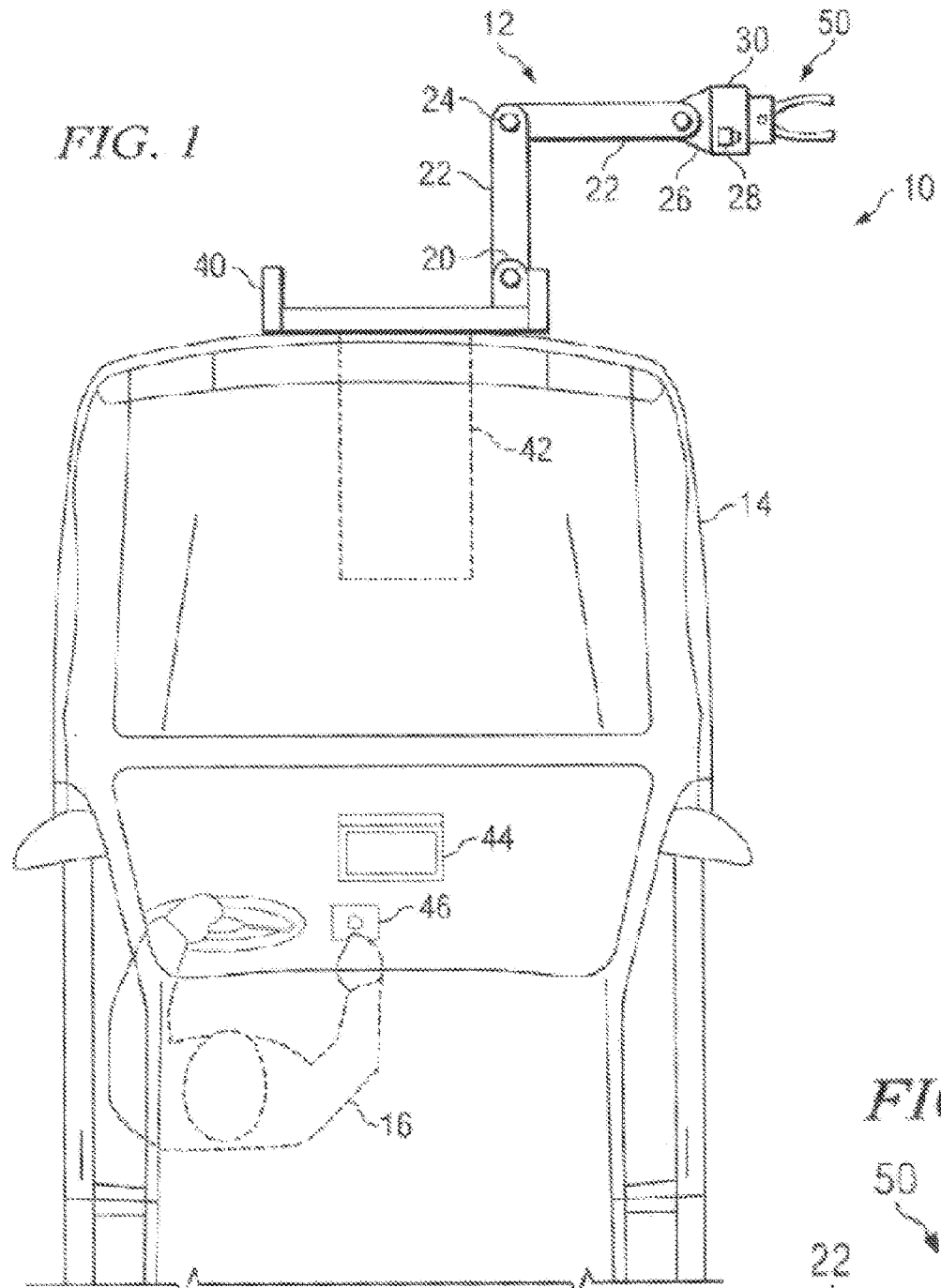
FIG. 1 is a block diagram of a remote controlled object removal system.

FIG. 1 is a block diagram of a remote controlled object manipulation system 10. System 10 comprises a manipulator arm 12 and a vehicle 14. System 10 operates to allow a user 16 to control manipulator arm 12 from a vehicle to remove objects from a road (not shown) or other location without requiring user 16 to exit the vehicle. In one embodiment, user 16 is a police officer and vehicle 14 is a police vehicle. Manipulator arm 12 comprises a mounting element 20, one more segments 22, one or more pivots 24, an end mount 26, a video camera 28 and a manipulator mounting 30. Vehicle 14 comprises an arm mount 40, a retraction portion 42, a video interface 44 and a control interface 46.

With respect to manipulator arm 12, mounting element 20 comprises a mechanical mounting point for segment 22 and is fixedly or movably coupled to arm mount 40. Mounting element 20 may contain or support wiring and other suitable electrical and/or electronic components to communicate digital and/or analog signals from control interface 46 to segments 22.

Segments 22 comprise rigid portions of arm 12 that are coupled between mounting element 20, one or more pivots 24 and mount 26. Arm 12 comprises at least one segment 22. Segments 22 support communication of video, power, data and other suitable mechanical and electrical elements. Segments 22 may contain or support wiring and other suitable electrical and/or electronic components to communicate digital and/or analog signals from control interface 46 to mounting 30 via segments 22.

Pivots 24 comprise mechanical, pneumatic, hydraulic, electrical, electromechanical or other suitable devices or combinations of devices to couple two segments 22 such that at least one of the coupled segments 22 can move with respect to the other. In one embodiment, pivot 24 may allow a segment 22 to rotate about pivot 24 in one dimension. In another embodiment, pivot 24 may allow movement in a plurality of dimensions, such as via a ball-and-socket mount or other suitable multiple dimension joint system. Pivots 24 further allow the continuation of wiring and other suitable electrical and/or electronic components to communicate digital and/or analog signals between mounting element 20, segments 22 and end mount 24.

End mount 26 comprises a mechanical, pneumatic, hydraulic, electrical, electromechanical or other suitable device, devices or combinations of devices to couple manipulator mounting 30 to segment 22. End mount 26 may allow movement of mounting 30 on or about mount 26 with respect to segment 22, or may fixedly couple mounting 30 to segment 22. End mount 26 further allows the continuation of wiring and other suitable electrical and/or electronic components to communicate digital and/or analog signals from segments 22 to manipulator mount 30.

Figure 4:
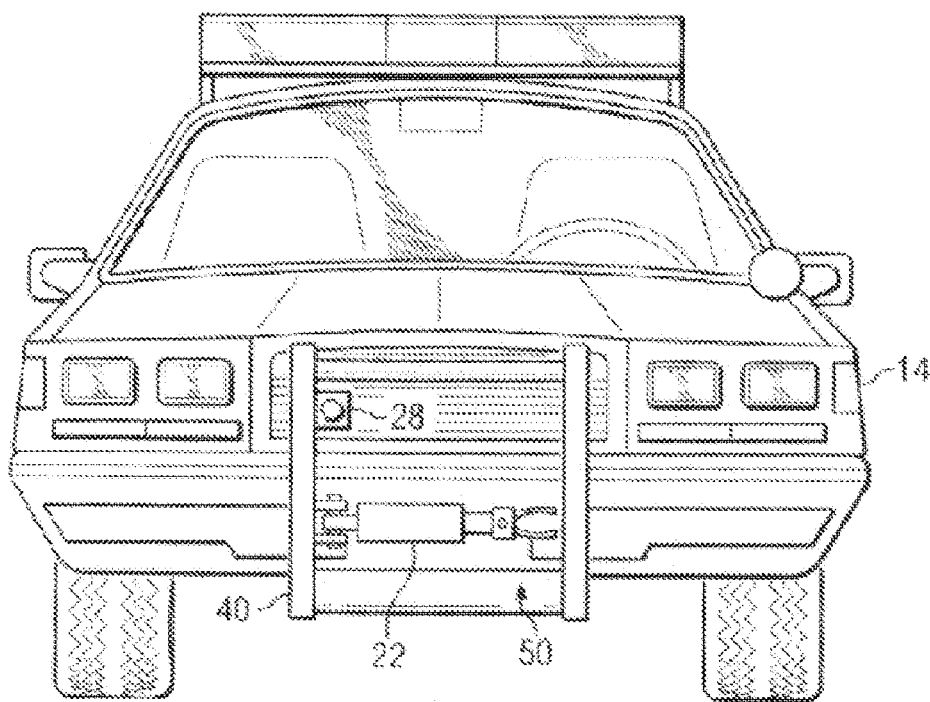
FIGS. 4 and 5 illustrate various embodiments of vehicles and vehicle mounting techniques for the remote controlled object removal system of FIG. 1.

Video camera 28 is coupled to manipulator mounting 30 and comprises any suitable video system for transmitting video to video interface 44. Video camera 28 may comprise any suitable image capture technology. In one embodiment, video camera 28 comprises a model designed for harsh environments, such as being outdoors at all times. In one embodiment, video camera 28 may further include a light source for illuminating the area in front of manipulator 50 to assist user 16 with controlling arm 12. The light source may optionally be movable independent of manipulator 50. Alternatively or in addition, the light source may comprise multiple light sources. Camera 28 may alternatively be coupled directly to mount 40 (as illustrated in FIGS. 4 and 50). In addition, multiple cameras 28 may be used to provide increased viewing options for user 16.

Manipulator mounting 30 comprises a mounting point for removably coupling one or more manipulators 50. Alternatively, manipulator mounting 30 may fixedly couple one or more manipulators 50. Manipulators 50 are described in greater detail in association with FIG. 2. Manipulator mounting 30 allows the continuation of wiring and other suitable electrical and/or electronic components to communicate digital and/or analog signals between end mount 24 and manipulator 50.

In one embodiment, mounting 30 comprises a multi-use mounting point for coupling a plurality of manipulators 50 and comprises a control linkage and a mechanical linkage. The control linkage comprises a suitable digital communications interface to send and receive data and commands between manipulator 50 and interfaces 44 and 46. Alternatively, the control linkage may comprise an analog, electromechanical, or a combination of one or more of analog, electromechanical and digital communications systems. The mechanical linkage comprises suitable physical and mechanical coupling for manipulator 50 to be coupled to mounting 30 and perform commands from control interface 46.

Manipulator 50 comprises a mechanical, electromechanical, magnetic, vacuum and/or other suitable devices for gripping, moving and otherwise manipulating objects, such as debris, bombs, animal carcasses and/or other items. Manipulator 50 is controlled via interfaces 44 and 46, and may communicate with interfaces 44 and 46 in a wired form via mounting 30 and/or wirelessly. Manipulator 50 is described in more detail in association with FIGS. 2, 3a, and 3b.

Figure 5:
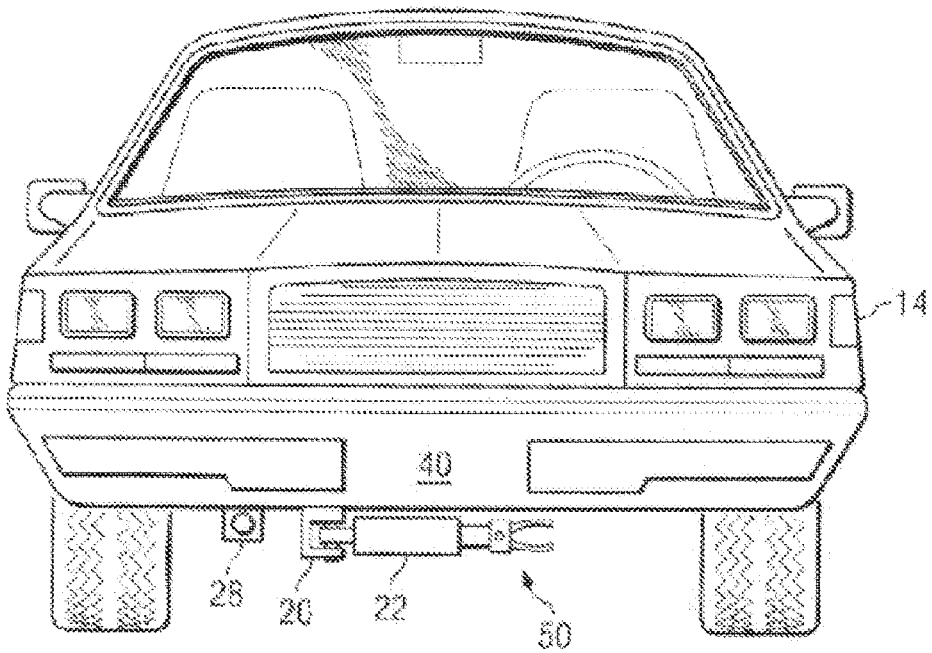

Returning to vehicle 14, arm mount 40 comprises a mechanical, pneumatic, hydraulic, electrical, magnetic, or other suitable systems for fixedly or moveably coupling mounting element 20 to vehicle 14. Arm mount 40 further comprises wiring and other suitable electrical and/or electronic components to communicate digital and/or analog signals between mounting element 20 and interfaces 44 and 46. In one embodiment, mounting element 20 is operable to move on arm mount 40 generally horizontally along arm mount 40. For example, arm mount 40 may be mounted across the front of vehicle 14 and allow mounting element 20 and arm 12 to move across the front of vehicle 14 along arm mount 40. Alternatively, arm mount 40 may fixedly couple mounting element 20 to vehicle 14. Also alternatively, arm mount 40 may fixedly couple mounting element 20 in one dimension. In addition, mounting element 20 and arm 12 may be capable of retracting or otherwise moving into retraction portion 42. In general, mount 40 may allow arm 12 to move along mount 40 in one or more directions and may optionally support the ability of arm 12 to retract into retraction portion 42. In the embodiment of FIG. 4, mount 40 is illustrated on a police vehicle. In the embodiment of FIG. 5, mount 40 is the bumper or a portion of the undercarriage of a standard vehicle which mounting element 20 is coupled to.

Retraction portion 42 comprises a portion of vehicle 14 operable to allow arm 12 to retract and be stored under or within vehicle 14. For example, retraction portion 42 may comprise a space under vehicle 14 for storing arm 12 and a mechanical system for retracting and extending arm 12. Alternatively, as illustrated in FIG. 4, retraction portion may comprise a portion or area of mount 40 and/or vehicle 14 with space for storing arm 12. In addition, as illustrated in FIG. 5, retraction portion 42 may comprise an open area under vehicle 14 for storing arm 12.

Video interface 44 comprises software and hardware operable to assist user 16 with controlling arm 12. For example, software may be provided to supplement or work in conjunction with control interface 46, such as by providing zoom controls for video camera 28, and/or software assisted control capabilities for arm 12, such as automatic or assisted stabilization. Video interface 44 may also include touch screen capabilities. Control interface 46 comprises a suitable device or devices for allowing a human user 16 to control arm 12 and manipulator 50 from within vehicle 14. Alternatively, control interface 46 may be removable from vehicle 14 or may be located on the outside of vehicle 14.

For example, interface 46 may have a wired or wireless communication system with arm 12, one or more portions of arm 12, and/or manipulator 50. For another example, interface 46 may be a joystick and a plurality of other controls for controlling arm 12 and manipulator 50. In one embodiment, interfaces 44 and 46 may be combined, such as in a laptop computer with a keyboard, mouse and display. For example, the laptop computer may further include a wireless interface for controlling arm 12 and manipulator 50 so that particularly hazardous situations may be handled from a distance.

In operation, user 16 uses interfaces 44 and 46 to control arm 12. For example, user 16 may use the view provided by video camera 28 to remove objects from a road or other area. For another example, an object to be removed from a puddle of toxic or corrosive liquid may involve use of arm 12. A variety of manipulators 50 may be used to manipulate such objects. For yet another example, a police officer may use arm 12 to remove an animal carcass or debris from a road. More specifically, interfaces 44 and 46 allow user 16 to control the extension and positioning of arm 12. Interfaces 44 and 46 may then be used to pickup, push and/or remove an object, such as from a road. Also, arm 12 may be used with video camera 28 to provide increased safety to user 16, by allowing user 16 to look around corners, into trunks of vehicles or pickup beds using arm 12.

Figure 2:
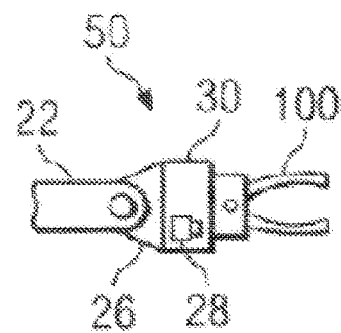
FIGS. 2, 3a, and 3b illustrate various embodiments of gripping elements usable with the remote controlled object removal system of FIG. 1.

FIG. 2 is a block diagram illustrating one embodiment of manipulator 50. In the embodiment of FIG. 2, manipulator 50 comprises a gripping element 100. Gripping element 100 comprises a mechanical, pneumatic, hydraulic, electrical, electro-mechanical or other suitable device for gripping an object. For example, gripping element 100 may be a pair of pincers, devices that are modeled on the human hand, such as one or more fingers and a thumb, or other similar devices. In the illustrated embodiment, gripping element 100 comprises a pair of pincers that close toward each other in order to grip an object. Alternatively, gripping element 100 may comprise a three element gripping element which uses three elements to grip an object. In general, gripping element 100 may use a suitable number of elements to grip objects such that arm 12 may move the object. Hydraulic, pneumatic, mechanical, electromechanical, electronic and/or other suitable techniques may be used to power gripping element 100.

Figure 3A:
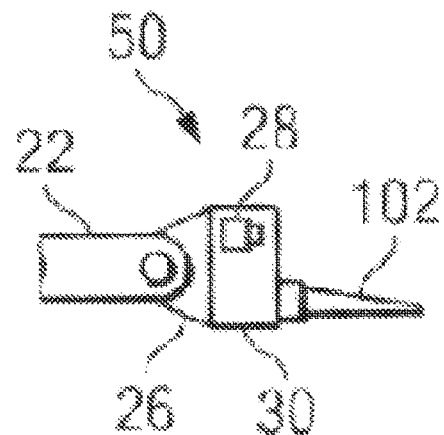
Figure 3B:
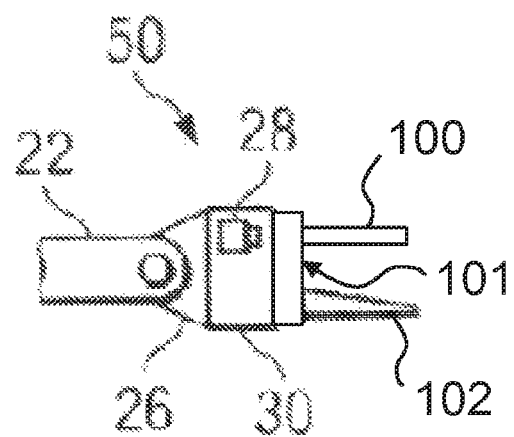

FIGS. 3a and 3b are block diagrams illustrating various embodiments of manipulator 50. In the embodiment of FIG. 3a, manipulator 50 may comprise a device 102 that may be slid underneath an object in order to lift and move the device, such as a shovel type device. Alternatively, device 102 may represent a launch system operable to dispense tear gas, pepper spray or other non-lethal munitions. Such devices 102 may be used in situations where exposing a public safety officer to the situation may be hazardous. For example, arm 12 may be used to dispense tear gas around a corner or into a structure or vehicle. In yet another embodiment, manipulator 50 may be a strong magnet, such as an electromagnet, for attracting metal objects magnetically. Alternatively, the manipulator may incorporate a vacuum device/mechanism so that it generates strong suction forces that can grip an object. In FIG. 3b showing a side view, manipulator 50 may comprise a combination of gripping elements 100 and device 102. The manipulator 50 may thus utilize the gripping elements 100 to grab or handle the object, while device 102 provides support below the object. Further, a surface 101 may be selectively magnetized to provide additional holding power to manipulator 50. Alternatively or in addition to surface 101, gripping elements 100 and/or device 102 may be selectively magnetized to better secure a metal object.

In addition to removing items from roadways, arm 12 may be used for a variety of purposes. For example, arm 12 may be used for more safely dealing with potential bomb situations. At times, public safety officials stop vehicles that are believed to be carrying bombs, such as in the trunk of the vehicle. In urgent situations, or in situations occurring in remote areas, the official stopping the vehicle may not have time to wait for a bomb squad to arrive, or may not have access to a bomb squad. In such situations, arm 12 may be used to access the trunk potentially containing the bomb remotely from the public safety vehicle and reduce the risk of injury to the official. For example, arm 12 could be used to reach into the truck (or other cargo area) and remove the bomb. Gripping element 100 could be used in such a situation, or a different manipulator 50 optimized for bomb work may be used. The vehicle may be equipped with self-driving capabilities to enable the user to remotely operate the vehicle as well as the arm, gripping element, and video camera to ensure the user's safety.

In general, arm 12 may be used in a variety of hazardous situations where the life of a person is at risk. One common situation is the removal of debris and other objects from roads that are in active use. By allowing a user to remotely control the arm to remove the debris, the safety of the user is increased by decreasing the chance that the user will be hit by a car on the road.

As described above, a video camera is mounted on the arm and/or elsewhere on the vehicle. An arm control is disposed within the vehicle and is operable to control the operation of the arm, the manipulator and the video camera. Alternatively or additionally, the arm control can be used to control the operations of the arm remotely from the vehicle. A video interface is coupled to the video camera which is operable to display output from the video camera. Alternatively or additionally, the video display may be incorporated with the remote arm control so that a user can view the operations of the arm and control its operations while being remotely located from the vehicle.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. For example, while police officers and police vehicles have been used as an illustrative example, other public safety, utility and/or private individuals and vehicles could be substituted.

The invention claimed is:

1. A system for remote object handling for mounting on a vehicle that accommodates at least one human occupant, the system comprising:

an articulated arm having at least two linked elongated segments, the arm being removably coupled at a single proximal end to the front portion of the vehicle;

a horizontally-extending gripping element removably coupled to a distal end of the articulated arm, and the at least two linked elongated segments of the articulated arm being capable of orienting the gripping element along multiple axes;

a video camera coupled to the horizontally-extending gripping element;

an arm controller in communication with the articulated arm, gripping element, and video camera, and operable to control the operation of the arm, the gripping element and the video camera;

a video interface in communication with the video camera and operable to display output from the video camera; and a mounting coupled to the front portion of the vehicle, wherein the vehicle has an associated retraction cavity disposed proximate to the mounting and wherein at least a portion of the arm is operable to retract into the retraction cavity.

2. The system of claim 1, wherein the articulated arm comprises a plurality of segments with a pivot between any two coupled segments.

3. The system of claim 1, wherein the arm comprises a munitions dispenser.

4. The system of claim 1, wherein the video interface is incorporated in the arm controller.

5. The system of claim 1, further comprising a video camera mounted proximate to the front portion of the vehicle.

6. The system of claim 1, wherein the articulated arm is removably mounted to the vehicle.

7. The system of claim 1, wherein the arm controller is wirelessly coupled to the articulated arm and video camera to enable remote control thereof.

8. The system of claim 1, wherein the arm controller incorporates the video interface configured to display the output from the video camera.

9. The system of claim 1, further comprising an independently-controllable directional light coupled to the arm for illuminating the operations of the arm and the gripping element.

10. The system of claim 1, further comprising a remote controller interface for remotely controlling the operations of the vehicle.

11. A system for remote object handling comprising:
a manned public safety vehicle;
a multi-segment articulated arm having a proximal end removably mounted on the vehicle, the multi-segment articulated arm having at least two linked segments;
a horizontally-extending gripping element removably coupled to a distal end of the arm, wherein the gripping element can be interchangeably coupled to the arm to incorporate a variety of tools;
a video camera mounted on the vehicle and pointed toward the articulated arm;
an arm controller in communication with the articulated arm, gripping element, and video camera, and operable to control the movement and extension of the arm and the gripping element so that it may grip and release an object, and the video camera;

a video interface in communication with the video camera and operable to display output from the video camera; and a mounting coupled to the front portion of the vehicle, wherein the vehicle has an associated retraction cavity disposed proximate to the mounting and wherein at least a portion of the arm is operable to retract into the retraction cavity.

12. The system of claim 11, wherein the articulated arm comprises a plurality of segments with a pivot between any two coupled segments.

13. The system of claim 11, wherein the arm comprises a munitions dispenser.

14. The system of claim 11, wherein the video interface is incorporated in the arm controller.

15. The system of claim 11, wherein the articulated arm is removably mounted to the vehicle.

16. The system of claim 11, wherein the arm controller is wirelessly coupled to the articulated arm and video camera to enable remote control thereof.

17. The system of claim 11, wherein the arm controller incorporates the video interface configured to display the output from the video camera.

18. The system of claim 11, further comprising an independently-controllable directional light coupled to the arm for illuminating the operations of the arm and the gripping element.

19. The system of claim 1, wherein the gripping element comprises a hand device having at least one finger and a thumb.

20. The system of claim 1, wherein the gripping element comprises a pincer device.

21. The system of claim 1, wherein the gripping element comprises a shovel.

22. The system of claim 1, wherein the gripping element comprises a vacuum element.

23. The system of claim 1, wherein the gripping element comprises a magnetic element.

24. The system of claim 11, wherein the gripping element comprises a pincer device.

25. The system of claim 11, wherein the gripping element comprises a hand device having at least one finger and a thumb.

26. The system of claim 11, wherein the gripping element comprises a shovel.

27. The system of claim 11, wherein the gripping element comprises a vacuum element.

28. The system of claim 11, wherein the gripping element comprises a magnetic element.

* * * * *